Figure 1:
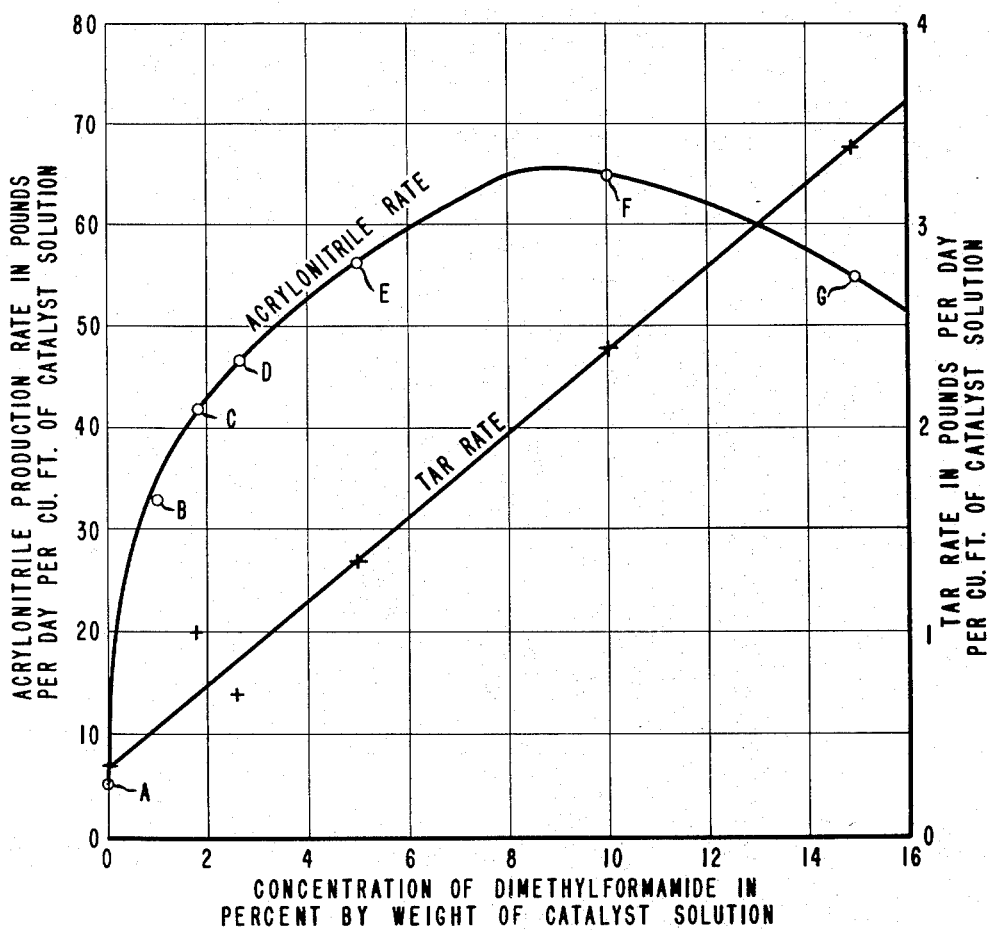

United States Patent Office 3,114,764
Patented Dec. 17, 1963

3,114,764
ACRYLONITRILE SYNTHESIS FROM ACETYLENE AND HYDROGEN CYANIDE IN NON-AQUEOUS PROMOTED CUPROUS CHLORIDE CATALYST SOLUTION
Jack Rowbottom, Liverpool, England, assignor to E. I. du Pont de Nemours and Company, Wilmington, Del., a corporation of Delaware
Filed Mar. 23, 1960, Ser. No. 17,203
7 Claims. (Cl. 260—465.3)

This invention relates to the production of acrylonitrile by the reaction of hydrogen cyanide and acetylene in a nonaqueous liquid catalyst. This application is a continuation-in-part of my copending application Serial No. 695,194, filed November 8, 1957, and now abandoned.

A common process for making acrylonitrile involves passing hydrogen cyanide and acetylene into an aqueous dispersion of cuprous chloride solubilized by having present therein a considerable amount of alkali metal halide or ammonium chloride or mixtures of these. An undesirable feature of these aqueous catalyst systems is the production of excessive amounts of acetaldehyde, lactonitrile and tars of an ill-defined and probably variable composition. These by-products not only represent irretrievable loss of raw material, but also make the purification of the acrylonitrile, as well as the recovery of the cuprous chloride catalyst, difficult and costly.

Nonaqueous catalyst media containing cuprous chloride have been suggested, but in most cases the rate of conversion of the raw material to acrylonitrile has not been as high as desired. And, although some by-products, such as acetaldehyde and lactonitrile, are not produced in these systems, the formation of tars is still a problem.

It is, accordingly, an object of this invention to provide an improved process for producing acrylonitrile by the reaction of hydrogen cyanide and acetylene in a nonaqueous liquid catalyst. It is also an object to provide such a process which will make possible a high rate of acrylonitrile production per unit amount of catalyst employed and a substantial reduction in the amount of by-product tar formed relative to the amount of acrylonitrile produced. Other objects will become apparent from the specification and claims.

In accordance with this invention, an outstanding improvement in the liquid phase process for the production of acrylonitrile by the reaction of acetylene and hydrogen cyanide at a temperature between about 70° and 150° C. is accomplished by passing the acetylene and hydrogen cyanide in a ratio of 25:1 to 2:1 into a substantially anhydrous liquid catalyst comprising essentially cuprous chloride dissolved in an organic nitrile solvent boiling above the boiling point of acrylonitrile which is thermally stable at the reaction temperature and based on the weight of the liquid catalyst, 0.2% to 30% of a carboxamide catalyst promoter boiling at a temperature above the reaction temperature and having a boiling point of at least 100° C. at atmospheric pressure. The carboxamide promoter is one wherein the carbonyl carbon is not a ring member, i.e., the present invention is not concerned with reactions in catalyst promoted with cyclic anhydrides such as lactams. The presence of water is undesirable because it reacts with acetylene to form by-products. For this reason the catalyst composition and reactants used in the process should be substantially anhydrous, this term being used to signify the degree of dryness which is commercially practical for technical chemicals.

The synthesis is carried out, in a manner similar to the aqueous cuprous chloride process of the prior art, by feeding hydrogen cyanide and an excess of acetylene into the catalyst liquid maintained at a sufficiently high temperature so that the acrylonitrile formed is carried out of solution with unreacted feed in vapor form. The acrylonitrile can be recovered from this off-gas in the conventional manner but recovery in pure form can be more readily accomplished, because of the absence of by-products resulting from reaction of water with acetylene, and because solvents and promoters can be used which are much less volatile than water and have much higher boiling points than acrylonitrile. Another advantage of these higher boiling liquids is that the reaction can be conducted at temperatures above the boiling point of the aqueous catalyst solutions. Hence, although the 70° to 100° C. reaction temperatures of the prior art can be used, it is generally preferable to operate at about 100° to 130° C. in order to obtain higher production rates. An undesirable amount of tar is formed at higher temperatures although temperatures up to 150° C. can be used. Increasing the pressure increases the production rate but, if used, superatmospheric pressure must be consistent with safe operation.

Figure 2:
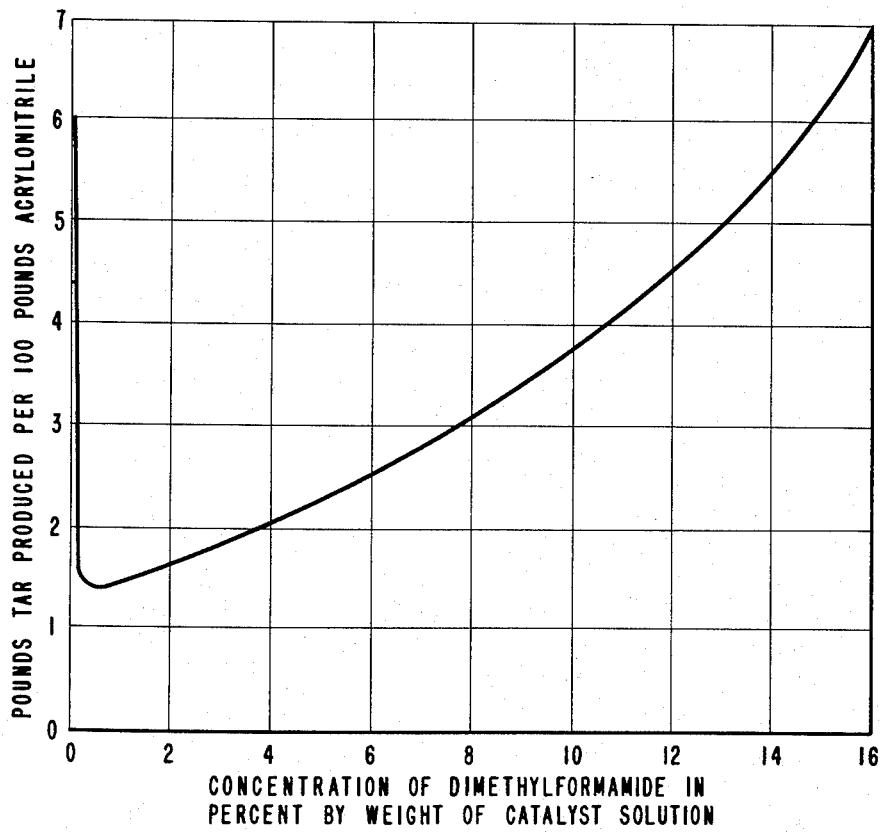

The presence of the organic amide promoter in the catalyst composition has a remarkable effect on the rate at which acrylonitrile can be produced and on the relative proportions of acrylonitrile and by-product tars produced. This is illustrated in the drawings wherein:

FIGURE 1 shows graphically the acrylonitrile rate of production and the corresponding by-product tar rate as a function of the amount of amide promoter in the catalyst composition, and FIGURE 2 shows graphically the pounds of tar produced per 100 pounds of acrylonitrile, as a function of the amount of amide promoter in the catalyst composition, for values calculated from FIGURE 1.

FIGURE 1 shows that, as the concentration of amide promoter is increased under otherwise comparable conditions, the rate of acrylonitrile production rises quite sharply as the concentration of amide is increased from 0% to 2% and then rises less spectacularly, but at a rate which is still highly significant, until the amide concentration is 8%. For the particular catalyst composition and conditions illustrated, this portion of the curve from 0% to 8% amide concentration corresponds to the empirical equation, $$\text{Acrylonitrile rate} = 30P^{1/3} + 5$$

in pounds acrylonitrile per day per cubic foot of catalyst solution where P is the concentration of amide promoter in percent by weight. The rate of acrylonitrile production then levels off and begins to decline at amide concentrations greater than about 10% by weight. This decline results from the decreasing solubility of cuprous chloride as the concentration of amide promoter is increased, so that it becomes impossible to have as much cuprous chloride present in the catalyst solution as previously. This portion of the curve conforms to the empirical relationship that the rate of acrylonitrile production is directly proportional to the cube of the cuprous chloride concentration in the catalyst solution.

The corresponding tar rate is also plotted in FIGURE 1, but using the different scale shown on the right-hand side of the graph. This plot shows that the tar rate increases linearly with increases of the amount of amide promoter in the catalyst solution, the change being much less rapid than is the case for the acrylonitrile rate. For the particular conditions illustrated, this straight line function corresponds to the empirical equation, $$\text{Tar rate} = 0.21P + 0.3$$

in pounds per day per cubic foot of catalyst solution where P is the concentration of amide promoter in percent by weight. The significance of this difference between the curves for the tar rate and the acrylonitrile rate becomes striking when the ratio is plotted as in FIGURE 2. The pounds of tar per 100 pounds of acrylonitrile obtained with no amide promoter in the catalyst solution drops to less than one-third of this value when only 0.2% of amide promoter for the catalyst is included. The relative amount of tar produced increases slowly and, at 10% concentration of amide promoter, is only about two-thirds of the initial value with 0% amide present. With 16% amide present in the catalyst solution, the ratio of tar to acrylonitrile produced is slightly more than at 0% amide concentration, but the rate of acrylonitrile production is many times greater than without the promoter.

These considerations indicate that a concentration of about 1% to 10% of amide promoter in the catalyst solution, and preferably about 2% to 8%, should be used to provide both a high rate of acrylonitrile production and a low relative rate of tar formation. However, if the rate of tar formation is not a major consideration, it may be desirable to use up to 16% or more of amide promoter. If the relative rate of tar formation is the primary consideration, it may be desirable to operate with only about 0.2% to 2% of amide promoter in solution.

The preferred amide promoters are substituted formamides having 1 to 3 of the hydrogen of formamide replaced by hydrocarbon groups of 1 to 10 carbon atoms each and free from aliphatic unsaturation; the hydrocarbon group being monovalent when substituted on the formamide carbon atom. Such amides include dimethylformamide, diethylformamide, dipropylformamides, dibutylformamides, N-formylpyrrolidine, N-formylpiperidine, N-methylformanilide, acetamide, dimethylacetamide, N-acetylmorpholine, N,N-dibutylpropionamides, N,N-diethyltoluamides, benzamide and their homologs. Other suitable promoters will be disclosed subsequently. Dimethylformamide and diethylformamide are especially preferred.

The thermally stable organic nitrile solvents boiling above the boiling point of acrylonitrile are such good solvents for cuprous chloride that there is no need to use solubilizer salts, such as the alkali metal halides, ammonium halides or amine hydrohalide salts disclosed in the prior art as necessary for forming aqueous or other cuprous chloride catalyst solutions for use in acrylonitrile synthesis. Appreciable amounts of such solubilizer salts are undesirable in the catalyst composition of the present invention because they increase the difficulties resulting from by-product tar formation during the reaction. Fouling in the reactor is more troublesome and recovery of cuprous chloride from used catalyst solution is more difficult when such salts are present. Some of the salts greatly increase the rate of formation of tars.

The organic nitrile solvent should boil above the boiling point of acrylonitrile (78° C.) so that the acrylonitrile can readily be separated by distillation. In general, for this reason and in order to avoid excessive loss from the catalyst composition, the organic nitrile should boil above 100° C. at atmospheric pressure and be relatively stable at this temperature. It is desirable to use an organic nitrile in which cuprous chloride is sufficiently soluble at 100° C. to form solutions containing over 10% cuprous chloride, and preferably at least 30%, by weight of the catalyst composition, since the concentration of cuprous chloride in solution has such a marked effect on the maximum production rate which can be obtained.

The more desirable organic nitriles are those of the general formulas

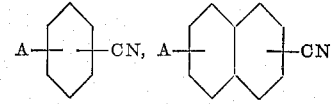

and

A—Y—CH$_2$CN wherein A represents hydrogen, methyl, methoxy, halogen, dimethylamino and cyano substituents, and Y represents a divalent hydrocarbon group of 1 to 9 total carbon atoms having not more than 4 linear aliphatic carbon atoms in any single carbon chain, such linear carbons being fully saturated. Suitable organic nitriles includes benzonitrile, tolunitriles, chlorobenzonitrile, methoxybenzonitrile, fluorobenzonitrile, phthalonitriles, naphthonitriles, phenylacetonitrile, phenylpropionitrile, phenylbutyronitrile, tetrahydrobenzonitrile, propionitrile, butyronitriles, chloropropionitrile, bromopropionitrile, methoxypropionitrile, dimethylaminopropionitrile, chlorobutyronitrile, bromobutyronitrile, bromovaleronitrile, succinonitrile, glutaronitrile, adiponitrile, and methyladiponitrile. Benzonitrile, adiponitrile and others of molecular weight above 100 are high boiling and are preferred.

The amount of organic nitrile solvent used should be sufficient to dissolve the cuprous chloride, without adding inorganic salt or salt of an organic amine to solubilize the cuprous chloride, and will generally be an amount at least equal in weight to the cuprous chloride to be dissolved, but the amount by which this is exceeded will depend upon the concentration of other compounds of the catalyst solution. The solution will usually contain about 30% to 60% of organic nitrile solvent. In operation of the process, the non-volatile by-products (tars) accumulate in the catalyst solution and the catalyst should be replaced before the tar concentration exceeds 30% by weight.

The concentration of tars is preferably kept below about 20% in weight by periodic partial replacement of the catalyst solution with fresh solution. As the concentration of tars in solution increases during a run, the proportion of organic nitrile can be decreased from that present in the initial solution to maintain the desired concentration of cuprous chloride and promoter in the reaction medium. The amount of amide promoter used should not exceed about 30% by weight of the catalyst solution, because it reduces the solubility of cuprous chloride to such an extent that the promotion of the acrylonitrile production rate is substantially nullified when the amide is used at concentrations greater than about 30%. Thus up to 40% cuprous chloride, by weight of solution, will dissolve in benzonitrile at 100° C., but a 2:1 benzonitrile:dimethylformamide solution will dissolve only 25% cuprous chloride at 100° C. The solubility at intermediate proportions of benzonitrile and dimethylformamide is given approximately by the equation, Percent CuCl = 40 − 0.6P where P is the percent by weight of dimethylformamide in solution. The improvement in acrylonitrile production rate obtained by 25% amide promoter, in a catalyst solution saturated with cuprous chloride, is no better than is obtained with only about 1% of this amount of amide promoter in a saturated cuprous chloride solution and operation of the process was found to be much more difficult.

It is advantageous to use the highest concentration of cuprous chloride practicable in the catalyst composition in order to provide for maximum production from a given catalyst space. The concentration of cuprous chloride in a saturated solution depends upon the nitrile solvent used, the temperature of operation, and the concentration of other materials in the catalyst solution. Undissolved cuprous chloride is not an effective catalyst for the reaction and tends to foul the reactor in which the catalyst solution is used. Part of the cuprous chloride is converted to other salts, such as cuprous cyanide, as the catalyst is used and, in use under normal operating conditions, the preferred catalyst composition will contain an amount of cuprous chloride in solution which is about 75% to 95% of the amount of cuprous chloride which would saturate fresh catalyst solution under the particular operating conditions. However, catalyst solutions which contain only one-half as much cuprous chloride are also highly useful for the reasons discussed. The advantage of a low relative rate of tar formation can be achieved with catalyst compositions which contain as little as 5% cuprous chloride.

The ratio of acetylene to hydrogen cyanide in the feed of reactants to the catalyst solution may be varied widely. Mol ratios of $C_2H_2$ to HCN of 25:1 to 2:1 are suitable. Higher ratios are operable but the recycling of excess acetylene becomes prohibitively expensive. At lower ratios the acrylonitrile is not swept out of the catalyst efficiently. Ratios of 15:1 to 6:1 are preferred. The hydrogen cyanide tends to convert the cuprous chloride to cyanides which are not effective catalysts. Preferably the concentration of cyanides calculated as CuCN is kept below 10% by introducing hydrogen chloride with the reactants. The amount should be carefully controlled to avoid excessive formation of vinyl chloride. An amount within the range of about 1% to 20% by weight of the hydrogen cyanide feed is used, as determined by analysis of the catalyst solution for cyanides and the off-gas for vinyl chloride for the particular conditions of operation. The hydrogen chloride may be introduced intermittently, although more uniform operation is generally obtained by continuous addition. The flow of reactants is preferably adjusted to provide a slight bleed-through of unreacted hydrogen cyanide, as determined by analysis of the off-gas. The unreacted components of the off-gas are generally recycled as part of the feed to the catalyst.

In the following examples, which illustrate embodiments of the invention, parts and percentages are by weight unless otherwise indicated:

EXAMPLE 1

A catalyst solution was prepared which contained 40% cuprous chloride, 50% adiponitrile and 10% dimethylformamide. The reaction temperature was 130° C. Acetylene and hydrogen cyanide were fed to the catalyst in a mol ratio of 15:1 at approximately atmospheric pressure. The total gas flow was adjusted so that about 5% of the hydrogen cyanide came through the catalyst unreacted. A feed of hydrogen chloride was maintained at 8% of the feed of hydrogen cyanide. Dimethylformamide was added to the catalyst from time to time to replace that lost by evaporation. The yield of acrylonitrile based on HCN was 95% of theoretical and based on acetylene was 86–90%. Acrylonitrile was produced at the rate of 82 pounds per day per cubic foot of catalyst solution, and tar was formed at a rate of 3.2 lbs./day/cu. ft. during 134 hours of operation.

In the absence of dimethylformamide, a 40% solution of cuprous chloride in adiponitrile at 130° C. produces only about 11.5 pounds of acrylonitrile per day per cubic foot of catalyst solution.

EXAMPLE 2

A catalyst solution was prepared which contained 40% cuprous chloride, 50% adiponitrile and 10% dimethylacetamide. The catalyst was operated at 115° C. The feeds of acetylene, hydrogen cyanide and hydrogen chloride were adjusted as in Example 1. The yields based on HCN and acetylene were as high as in the previous example. Acrylonitrile production reached the rate of 40–44 pounds per day per cubic foot of catalyst solution.

In the absence of dimethylacetamide, a 40% solution of cuprous chloride in adiponitrile at 115° C. produces only about 6 pounds of acrylonitrile per day per cubic foot of catalyst solution.

EXAMPLE 3

The previous example was duplicated except that 10% benzamide was used instead of 10% dimethylacetamide. Acrylonitrile was produced at the rate of 20 pounds per day per cubic foot of catalyst solution, or about 3 times the production rate obtained under these conditions in the absence of benzamide.

EXAMPLE 4

A catalyst solution was prepared which contained 35% cuprous chloride, 10% dimethylformamide and 55% benzonitrile. The catalyst was operated at 100° C., i.e., the reaction was carried out at this temperature. Acetylene and hydrogen cyanide were fed to the catalyst in a mol ratio of 15:1 at approximately atmospheric pressure. The total gas flow was adjusted so that about 5% of the hydrogen cyanide came through the catalyst unreacted. The cyanide content of the catalyst was maintained at about 5%, calculated as CuCN, by feeding in hydrogen chloride at a rate of 8% by weight of the hydrogen cyanide feed. Dimethylformamide was added from time to time to replace evaporation losses, and benzonitrile was likewise added as necessary to maintain a constant volume of catalyst solution. The yield of acrylonitrile based on HCN was 95–98% of theoretical and based on acetylene was 86–94%. The run was continued for 100 hours. During steady conditions of operation acrylonitrile was produced at an average rate of 65 pounds per day per cubic foot of catalyst solution, and the corresponding tar rate was 2.4 lbs./day/cu. ft. These results are plotted at (F) in FIGURE 1.

In the absence of dimethylformamide a 35% solution of cuprous chloride in benzonitrile at 100° C. produces only 5 pounds of acrylonitrile/day/cu. ft. and the corresponding tar rate is 0.3 lb./day/cu. ft. This is shown at (A) in FIGURE 1.

EXAMPLE 5

Example 4 was repeated but with a lower concentration of dimethylformamide. After 48 hours, steady conditions of operation were achieved with the dimethylformamide concentration maintained at 2.4–2.8% for 100 hours. Acrylonitrile was produced at an average rate of 47 lbs./day/cu. ft. and the corresponding tar rate was 0.7 lb./day/cu. ft. These results are shown at (D) in FIGURE 1.

EXAMPLE 6

Example 4 was repeated with an initial catalyst solution containing only 1% dimethylformamide. After 47 hours, the catalyst composition was adjusted to contain 1.9% dimethylformamide and the run was continued for 100 hours. The initial acrylonitrile rate at 1% dimethylformamide was 33 lbs./day/cu. ft. and the subsequent rate at 1.9% dimethylformamide was 42 lbs./day/cu. ft. The corresponding tar rate was 1.0 lb./day/cu. ft. These results are shown at (B) and (C) in FIGURE 1.

EXAMPLE 7

Example 4 was repeated with a catalyst solution containing 5% of dimethylformamide. The run was continued for 143 hours at an average acrylonitrile rate of 56 lbs./day/cu. ft. and a corresponding tar rate of 1.35 lbs./day/cu. ft. These results are shown at (E) in FIGURE 1.

EXAMPLE 8

Example 4 was repeated with a catalyst solution containing 31% cuprous chloride, 15% dimethylformamide and 54% benzonitrile. This solution was saturated with cuprous chloride at 100° C. A run of 100 hours was made at an average acrylonitrile rate of 55 lbs./day/cu. ft. and a tar rate of 3.4 lbs./day/cu. ft. The results are shown at (G) in FIGURE 1.

EXAMPLE 9

Example 4 was repeated with a catalyst solution containing cuprous chloride, benzonitrile and 25% dimethylformamide. The concentration of cuprous chloride had to be reduced to 25% to obtain a homogeneous solution at 100° C. During the run of 90 hours there were severe oscillations in the yield, conversion and rate of acrylonitrile production. The average acrylonitrile rate was about 23 lbs./day/cu. ft. of catalyst solution.

EXAMPLE 10

Example 4 was repeated with catalyst solutions containing 35% cuprous chloride, 60% benzonitrile and 5% organic amide promoter as indicated in Table I. Also shown in the table are the duration of the run in hours, the average acrylonitrile (ACN) rate of production for the run in pounds per day per cubic foot of catalyst solution, the relative tar rate in pounds of tar per 100 pounds of acrylonitrile (ACN) produced, and the catalyst promotion as the ratio obtained by dividing the acrylonitrile rate by the rate of production in the absence of any promoter. It has already been noted in Example 4 that unpromoted catalyst, containing 35% cuprous chloride and 65% benzonitrile, under corresponding conditions produces acrylonitrile at a rate of 5 lbs./day/cu. ft. and tar at a rate of 0.3 lb./day/cu. ft. (6 lbs. tar/100 lbs. ACN). As indicated in the table, some of the catalyst compositions were operated at 120° C.; at this temperature the acrylonitrile rate with unpromoted catalyst is 10 lbs./day/cu. ft. rather than 5. It will be seen that each of the organic amides gave a promotion of at least 1.5 (at least 50% improvement), and all except N,N-dimethyl-p-toluenesulfonamide gave a lower relative tar rate than the above rate for unpromoted catalyst.

*Table I*

EFFECT OF OTHER ORGANIC AMIDE PROMOTERS ON RATE OF PRODUCTION OF ACRYLONITRILE AND TAR

| Amide Promoter | Duration of Run | ACN Rate | Tar per 100 ACN | Catalyst Promotion |
|---|---|---|---|---|
| (a) Di-isopropylformamide | 63 | 39 | 2.4 | 7.8 |
| (b) Di-n-butylformamide | 38 | 40 | | 8 |
| (c) N-Formylpyrrolidine | 67 | 56 | 3.8 | 11.2 |
| (d) N-Formylpiperidine | 38 | 62 | 1.9 | 12.4 |
| (e) N-Methylformanilide | 24 | 16 | | 3.2 |
| (f) Acetamide (10% conc.) | 130 | 29 | 4.9 | 5.8 |
| (g) N-Acetylmorpholine | 17 | 23 | | 4.6 |
| (h) N,N-Di-n-butylpropionamide | 24 | 12 | 2.8 | 2.4 |
| (i) N,N-Di-isobutylpropionamide | 33 | 14 | | 2.8 |
| (j) N,N-Diethyl-m-toluamide | 45 | ¹20 | 0.4 | 2 |
| (k) Ethyl carbamate | 43 | ¹15 | 4.8 | 1.4 |
| (l) Tetramethylurea (3% conc.) | 44 | ¹34 | 1.7 | 3.4 |
| (m) N,N-Dimethyl-p-toluenesulfonamide | 16 | ¹18.6 | 7.4 | 1.9 |

¹ The last four catalyst compositions were operated at 120° C. instead of 100° C.

EXAMPLE 11

A cuprous chloride-diethylformamide-benzonitrile catalyst solution was operated at 100°–115° C. so that it analyzed, exclusive of reactants and volatile reaction products, about 35% total cuprous salts calculated as CuCl and CuCN, about 8% diethylformamide, and about 57% total benzonitrile plus non-volatile by-products (tars). Acetylene and hydrogen cyanide were fed to the catalyst in a mol ratio of 15:1 at approximately atmospheric pressure together with hydrogen chloride at a rate of 8% by weight of the hydrogen cyanide feed. The total gas flow was adjusted as necessary to maintain 0.25 to 0.75 mol percent HCN in the off-gas from the reaction. The volume of catalyst solution was maintained substantially constant by adding a mixture of diethylformamide and benzonitrile, every 4 hours, in the correct proportions to maintain 8% diethylformamide in the catalyst solution. Table II shows the average rates of acrylonitrile production and tar formation for the indicated periods of 1.5 to 3 days during the run, together with the yields obtained and analyses made to control the composition of the solution and flow of feed gas. The overall average production was 69 lbs. acrylonitrile/day/cu. ft. of catalyst solution for 17 days before catalyst replacement became desirable because of the accumulation of by-product tars.

*Table II*

PROMOTION WITH 8% DIETHYLFORMAMIDE

| | 0–2 | 2–4 | 4–7 | 7–9 | 9–12 | 12–14 | 14–15.5 | 15.5–17 |
|---|---|---|---|---|---|---|---|---|
| Period of run (days) | | | | | | | | |
| Acrylonitrile average rate (lbs./day/cu. ft. solution) | 57 | 62 | 67 | 72 | 67 | 82 | 84 | 62 |
| Relative tar rate (lbs./100 lbs. ACN) | 1.68 | 1.05 | 0.64 | 1.4 | 0.7 | 2.5 | 3.6 | 5.1 |
| Acrylonitrile yield (percent based on HCN) | 78 | 81 | 94 | 99 | 94 | 100 | 100 | 97 |
| Catalyst temperature (° C.) | 100 | 100 | 100 | 100 | 100 | 110 | 115 | 115 |
| Analysis of catalyst solution: | | | | | | | | |
| Percent CuCl (apparent) | 27.1 | 28.5 | 29.6 | 28.4 | 26.4 | 26.6 | 30.3 | 25.8 |
| Percent CuCN (apparent) | 6.0 | 5.6 | 5.0 | 6.0 | 7.8 | 7.1 | 4.2 | 7.5 |
| Percent $HCO \cdot N(C_2H_5)_2$ | 7.9 | 7.8 | 8.0 | 8.7 | 9.3 | 9.3 | 7.7 | 8.0 |
| Percent $C_6H_5CN$ | 56.1 | 54.5 | 50.1 | 46.2 | 46.0 | 38.1 | 32.0 | 28.1 |
| Percent Tars | 2.3 | 3.4 | 5.1 | 7.8 | 9.5 | 14.7 | 22.2 | 27.8 |
| Off-gas analysis: | | | | | | | | |
| Mol Percent HCN (average) | 0.4 | 0.35 | 0.35 | 2.2 | 0.5 | 0.4 | 0.3 | 0.4 |
| Mol Percent $CH_2=CHCl$ | 1.0 | 0.25 | 0.15 | 0.25 | 0.25 | 0.45 | 0.35 | 0.40 |
| Mol Percent $CH_2=CH \cdot C \equiv CH$ | 1.9 | 1.4 | 2.0 | 0.90 | 0.35 | 0.20 | 0.45 | 0.05 |
| Mol Percent $CH_2=CH \cdot C \equiv C \cdot CH=CH_2$ | 0.3 | 0.25 | 0.05 | 0.05 | 0.0 | 0.0 | 0.0 | 0.0 |

A wide variety of other organic amides may be used with nitrile solutions of cuprous chloride, as promoters of the addition of hydrogen cyanide to acetylene to form acrylonitrile, including amides of monocarboxylic acids, such as formamide, acetamide, the propionamides and the butyramides as well as their mono- and di-N-substituted methyl, ethyl, propyl and butyl derivatives; amides of dicarboxylic acids, such as oxamide, malonamide, succinamide, glutaramide and adipamide as well as their mono- and di-N-substituted methyl, ethyl, propyl and butyl derivatives; and related compounds which differ only in containing an ether oxygen in a substituent group. The hydrohalides, preferably the hydrochlorides of these amides, to the extent to which they are formed, are also effective promoters of the anhydrous cuprous chloride catalyst system.

In general, compounds having the group

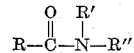

are suitable catalyst promoters provided they are stable under reaction conditions involving reaction temperatures up to about 150° C. The substituents R, R' and R'' are hydrogen, alkyl, aryl, alkaryl, aralkyl or R' and R'' may form part of a ring structure, and these substituents may contain other substituents such as halogen, nitro, and others, provided only that they are stable under the reaction conditions in the catalyst system. R, R' and R'' are limited to not over 10 carbon atoms each. The promoter may contain more than one amido group in the molecule and be suitable for the purposes of this invention.

In general, a promoter is an amide of the classes described above which will increase the activity of the catalyst at least 50% over that in the system containing only the nitrile solvent for cuprous chloride.

Since many different embodiments of the invention may be made without departing from the spirit and scope thereof, it is to be understood that the invention is not limited by the specific illustrations except to the extent defined in the following claims.

I claim:
1. In the liquid phase process for the production of acrylonitrile by the reaction of acetylene and hydrogen cyanide at a temperature between about 70° and 150° C. in a cuprous chloride catalyst solution and recovery of acrylonitrile from the reaction mixture, the improvement of passing the acetylene and hydrogen cyanide in a ratio of 25:1 to 2:1 into a substantially anhydrous liquid catalyst comprising essentially cuprous chloride dissolved in an organic nitrile boiling above the boiling point of acrylonitrile which is thermally stable at the reaction temperature and, based on the weight of the liquid catalyst, 0.2% to 30% of a carboxamide catalyst promoter boiling at a temperature above the reaction temperature and having a boiling point of at least 100° C. at atmospheric pressure, said carboxamide promoter being one wherein the carbonyl carbon is not a ring member.

2. A process as defined in claim 1 wherein hydrogen chloride is fed into said anhydrous liquid catalyst in an amount between about 1% and 20% by weight of the hydrogen cyanide feed.

3. A process as defined in claim 1 wherein said organic nitrile has a boiling point above about 100° C. at atmospheric pressure.

4. A process as defined in claim 1 wherein said carboxamide promoter is a substituted formamide having 1 to 3 of the hydrogens of formamide replaced by hydrocarbon groups of 1 to 10 carbon atoms each and free from aliphatic unsaturation.

5. A process as defined in claim 1 wherein said liquid catalyst comprises essentially cuprous chloride catalyst, benzonitrile solvent and dimethylformamide promoter.

6. A process as defined in claim 1 wherein said liquid catalyst comprises essentially cuprous chloride catalyst, benzonitrile solvent and diethylformamide promoter.

7. A process as defined in claim 1 wherein said liquid catalyst contains at least 30% cuprous chloride.

References Cited in the file of this patent

UNITED STATES PATENTS

| | | |
|---|---|---|
| 2,553,008 | Sager | May 15, 1951 |
| 2,649,418 | Stehman | Aug. 18, 1953 |
| 2,698,337 | Heider et al. | Dec. 28, 1954 |
| 2,702,300 | Keller et al. | Feb. 15, 1955 |
| 2,757,192 | Jenner | July 31, 1956 |
| 2,798,883 | Christopher | July 9, 1957 |
| 2,798,884 | Christopher et al. | July 9, 1957 |
| 2,920,098 | Burrus et al. | Jan. 5, 1960 |